United States Patent [19]

Martin et al.

[11] Patent Number: 5,209,025
[45] Date of Patent: May 11, 1993

[54] PROCESS FOR SHARPENING THE KNIVES OF A ROTATING DRUM AND ADJUSTING THE FIXED COUNTER-KNIFE COOPERATING THEREWITH AND DEVICE FOR CARRYING OUT THIS PROCESS

[75] Inventors: Jean-Paul L. M. Martin, St Gilles-Croix de Vie; Louis J. B. Pambrun, La Roche S/Yon; Henri G. Beauchene, Challans, all of France

[73] Assignee: Hesston Braud, France

[21] Appl. No.: 721,097

[22] Filed: Jun. 25, 1991

[30] Foreign Application Priority Data

Jun. 25, 1990 [FR] France ................... 90 07934

[51] Int. Cl.⁵ .................... B24B 3/55; A01D 75/08
[52] U.S. Cl. ........................ 51/249; 51/247; 56/250; 76/82.1
[58] Field of Search ............. 56/12.1, 250; 51/246, 51/247, 249, 254; 76/82.1, 85

[56] References Cited

U.S. PATENT DOCUMENTS

| | | | |
|---|---|---|---|
| 3,793,792 | 2/1974 | Wagstaff et al. | 51/249 |
| 4,321,773 | 3/1982 | Fleming | 56/250 X |
| 4,503,643 | 3/1985 | Johnson et al. | 51/247 |
| 4,843,303 | 5/1989 | McClure et al. | 51/249 X |

FOREIGN PATENT DOCUMENTS

| | | | |
|---|---|---|---|
| 3841829 | 7/1989 | Fed. Rep. of Germany | 51/246 |
| 2028191 | 3/1980 | United Kingdom . | |

Primary Examiner—David J. Bagnell
Attorney, Agent, or Firm—Bryan Cave

[57] ABSTRACT

In a fodder harvesting machine, the device disclosed comprises a rotating chopping drum (1) and a fixed counter-knife (25) cooperating with the knives (2) of the drum (1), as well as a retractable wheel (21) adapted to be moved in rotation in order periodically to sharpen the knives (2). According to the invention, at least two positioners (5, 6, 7, 8) located near the free ends of the chopping drum (1) are mounted to pivot about the geometrical axis thereof and connected to an actuation device (a) bringing, by pivoting, the end contact piece (8) of each positioner (7) either opposite the wheel (21), or opposite a corresponding stop (32) of the counter-knife (25) which is fastened to a fixed support (3, 35) via a presser device (34) and a fixing device (33).

16 Claims, 4 Drawing Sheets

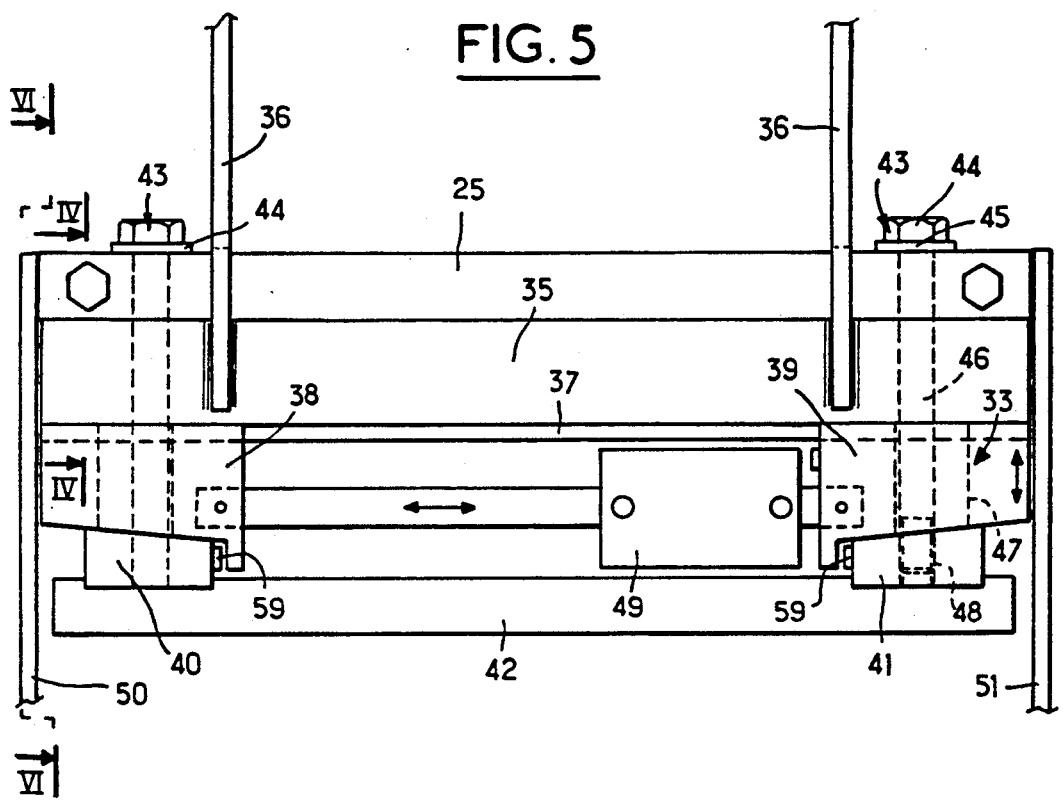
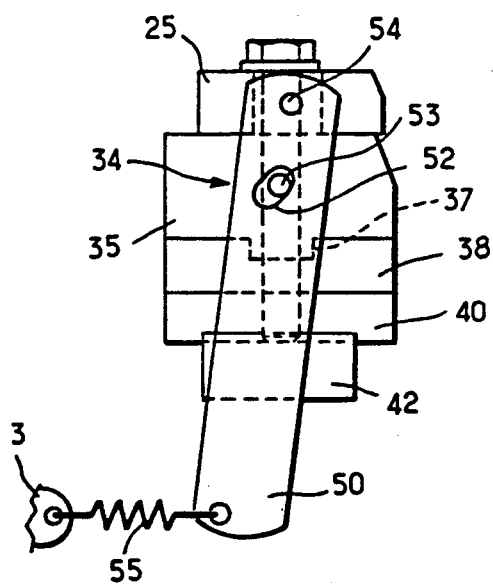

PROCESS FOR SHARPENING THE KNIVES OF A ROTATING DRUM AND ADJUSTING THE FIXED COUNTER-KNIFE COOPERATING THEREWITH AND DEVICE FOR CARRYING OUT THIS PROCESS

FIELD OF THE INVENTION

The present invention relates to a process for sharpening knives of a rotating drum and for the adjustment of the fixed counter-knife cooperating therewith and to a device for carrying out this process.

BACKGROUND OF THE INVENTION

Fodder-cutters used in fodder harvesters comprise chopping cylinders or drums which rotate at high speed and of which the knives cooperate with a fixed counter-knife to chop agricultural products entering in the form of stems, leaves or the like, into small pieces or elements. The position of the counter-knife with respect to the knives of the drum and the state of the fine edge of the knives are critical for obtaining suitable cutting, a uniform length of the cut elements and a minimum energy consumption.

It is therefore essential that the edge of the knives remain perfect and that the clearance between said knives and the counter-knife remain minimum. Consequently, in order to obtain a good result, the knives must be sharpened several times every day, the minimum being removed each time, accompanied by an adjustment of the counter-knife. This obviously implies that all the operations be effected very rapidly, in perfect safety for the personnel and the equipment.

Such is the general purpose of the present invention, common to the other heretofore known devices.

However, in the latter, the function of sharpening is not associated with that of the adjustment of the counter-knife. Yet it is advantageous to carry out these operations simultaneously and this is the particular object of the present invention, within the framework of the general purpose set forth hereinabove, thanks to which a maximum efficiency of the machine can be attained with a minimum time of sharpening/adjustment.

Furthermore, the present invention does not employ the complex electronic systems of the heretofore known devices, which are always difficult to repair in an agricultural environment, and proposes a device which employs simple mechanics of which only the monitoring is ensured by electrical or electronic means, which are, themselves, very simple.

SUMMARY OF THE INVENTION

To that end and in accordance with the invention, the proposes process consists:

in bringing at least two positioners, aligned with the counter-knife, opposite a knife-sharpening wheel, by pivoting said positioners about the axis of rotation of the drum, the angular situation of said wheel being fixed, grinding the ends of these positioners with the wheel, at the same time as the latter sharpens the knives during rotation of the drum, thereafter returning said positioners opposite the counter-knife by pivoting in the opposite direction, and in adjusting the counter-knife again by applying stops with which it is provided against these positioners.

This process is carried out in particular in a device applied to a fodder harvesting machine, which comprises a rotating chopping drum and a fixed counter-knife cooperating with the knives of the drum, as well as a retractable wheel adapted to be moved in rotation to sharpen said knives periodically.

According to the invention, in this device, at least two positioners located near the free ends of the chopping drum are mounted to pivot about the geometrical axis thereof and connected to an actuating device for bringing, by pivoting, the end contact piece of each positioner either opposite the wheel in order to be ground to the same diameter as the knives are sharpened thereby, or opposite a corresponding stop of the counter-knife, which is fastened to a fixed support via, on the one hand, a presser device tending to apply its stops against the contact pieces of the positioners and, on the other hand, a fixing device.

In an advantageous embodiment, each positioner is an arm integral with a ring mounted to pivot about a journal of the chopping drum, this arm extending toward the periphery and comprising at its end an expendable contact piece mounted in interchangeable manner.

The actuation device comprises, for each positioner, a connecting rod of which a bend end is articulated on the ring of the positioner in question and of which the other end, suitably guided, is coupled to a jack abutting on the fixed frame of the machine.

The end of the actuation rod coupled to the jack is articulated at the end of a lever mounted to pivot in its median part about a fixed pin, the free ends of the levers of the two positioners being articulated on a rigid longitudinal trap ensuring, on the one hand, closure of a passage made for the retractable wheel in the casing of the chopping drum and, on the other hand, coupling of the two actuation rods.

The device for fixing the counter-knife comprises:

on the one hand, a fixed ruler mounted on the frame of the harvesting machine to support the counter-knife and defining a guideway for two mobile wedges having opposite inclinations and capable of being moved towards or away from each other by a jack, on the other hand, a floating ruler integral with conjugate wedges and connected to the counter-knife resting on the fixed ruler, by screws passing therethrough.

The presser device applying the stops of the counter-knife against the contact pieces of the positioners comprises at least two levers of which one end is articulated on the counter-knife, the other end is connected to an elastic member and of which the median part is mounted to pivot about a pivot pin of said fixed support.

Each lever of the presser device defines, for the passage of the pivot pin of the fixed support, a slot of which one bearing edge is inclined so that the reaction of said pin to the elastic force has for an effect not only to apply the stops of the counter-knife against the contact pieces of the positioners, but also to press said counter-knife on the fixed support.

The rotating wheel is mounted on a mobile carriage parallel to the axis of the chopping drum, the carriage being adjustable in distance relatively thereto.

The wheel-holder carriage is, on the one hand, mounted to slide along and to pivot about a cylindrical guiding bar and, on the other hand, connected to a carriage cooperating by reaction, by an adjustable coupling member, this carriage cooperating by reaction being mounted to slide on this bar and another parallel guiding element.

BRIEF DESCRIPTION OF THE DRAWINGS

The invention will be more readily understood on reading the following description with reference to the accompanying drawings, in which:

FIG. 5 is a view in elevation on a larger scale along line V—V of FIG. 2, showing the device for fixing the counter-knife.

FIG. 6 is a view in elevation along line VI—VI of FIG. 5, showing the presser device applied on the counter-knife and its fixing device.

DETAILED DESCRIPTION OF THE DRAWINGS

Figure 1:
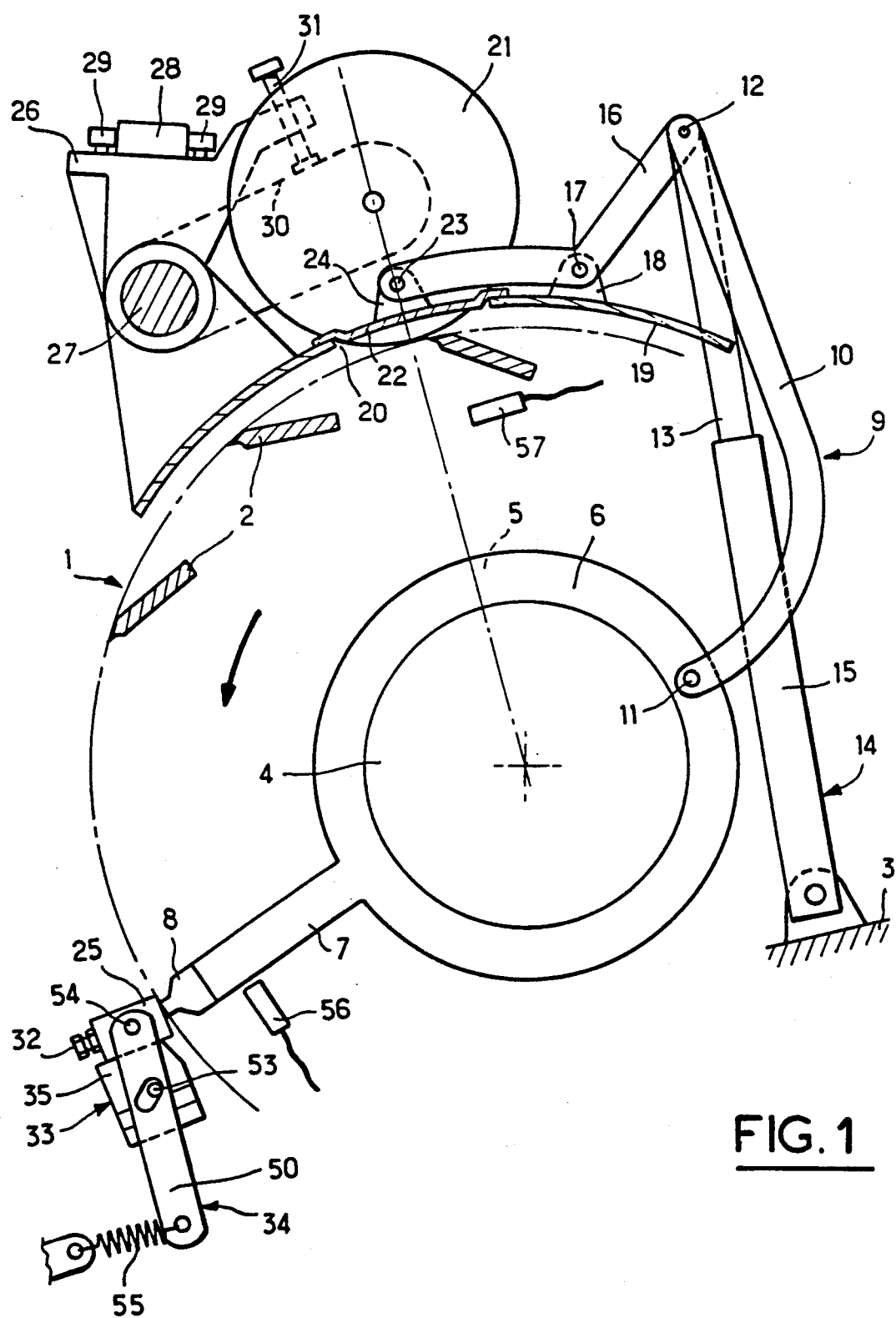
FIG. 1 is a diagram illustrating the device of the invention in standby position whilst the chopping drum is working.

Referring now to the drawings, the harvesting machine is not shown and only its rotating chopping drum 1 appears in dashed and dotted lines in the drawing by the outer envelope of the cutting edges of knives 2 with which this drum is equipped. Said drum is mounted to rotate on a fixed frame of the machine, which frame is not shown either and of which the points of abutment are designated by reference 3.

The drum 1 comprises end journals 4 of which only a thin zone adapted to constitute a circular bearing surface for pivoting, is shown. Parts 4 are intended for pivotally guiding two rings 5 and 6 located on either side of the drum 1 and each extended by a positioner arm 7 provided with a contact piece 8 interchangeable after wear due to successive grindings.

Figure 2:
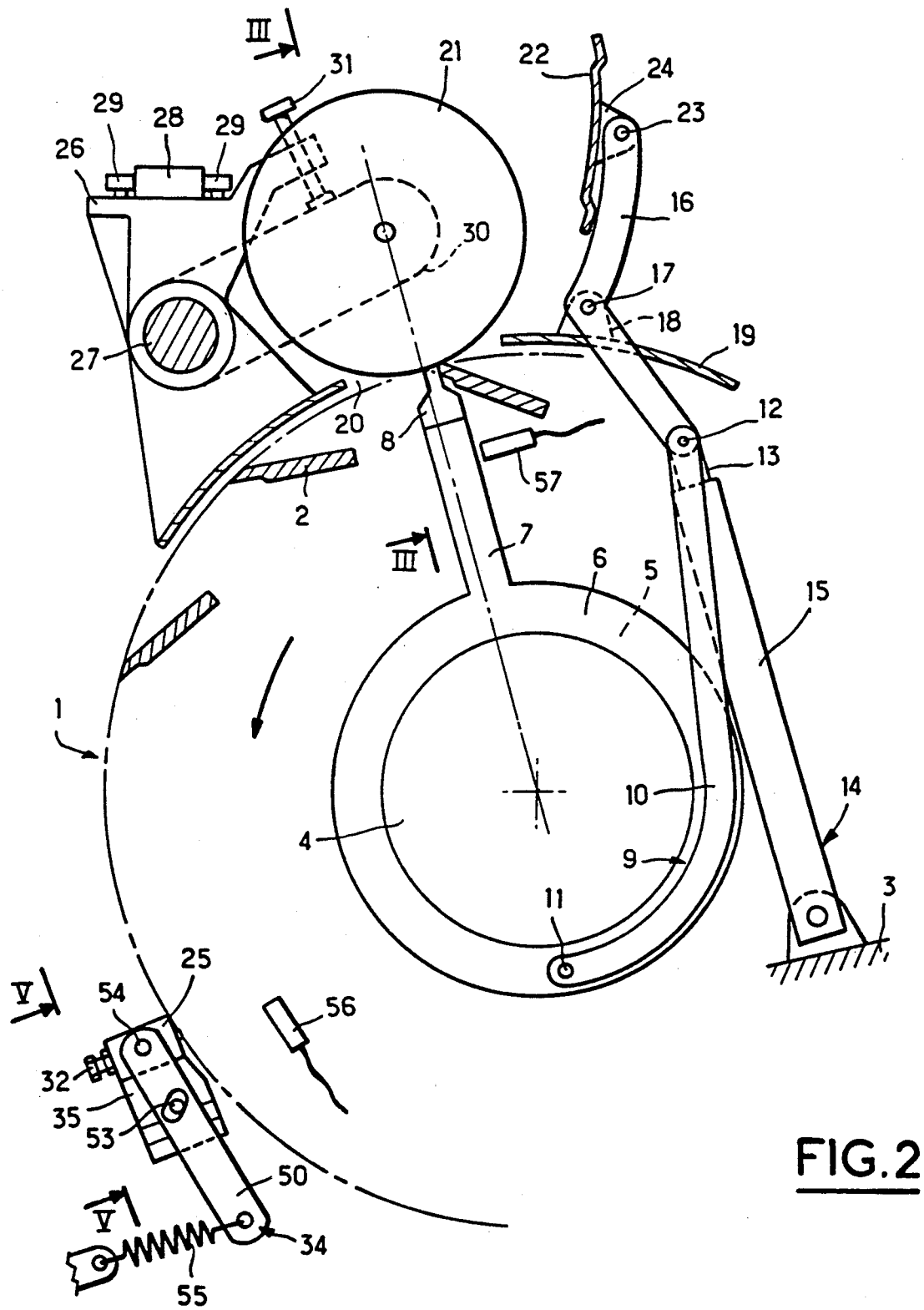
FIG. 2 is a view similar to FIG. 1 showing the same device in position for sharpening the knives and for adjusting the counter-knife.

A device 9 for synchronously actuating the positioning rings 5 and 6 comprises, for each ring, a coupling rod 10 of which an end bent concentrically to the geometrical axis of the drum for the position illustrated in FIG. 2, is articulated by means of a pin 11 on the ring in question, whilst its other end is articulated by means of a common pin 12, on the one hand, on the piston rod 13 of a jack 14 whose cylinder 15 abuts on the fixed frame 3, on the other hand, on one of the ends of a bent lever 16 mounted to pivot about a pin 17. This pin 17 is borne by a tab 18 of a casing 19 connected to the fixed frame to envelop and protect the drum 1.

The casing 19 defines a passage 20 for a sharpening wheel 21 described hereinbelow.

When the chopping device is in position for operation illustrated in FIG. 1, the passage 20 must be closed by a trap 22 and the wheel 21 must be retracted. The free end of the lever 16 is articulated on a pin 23 of a tab 24 of the trap 22. The rigid connection of the two levers 18 and thus the synchronous coupling of the two rings 5 and 6 are consequently ensured by said trap 22. In the said position illustrated in FIG. 1, in which the chopping device is ready for operation, the wheel 21 is retracted, the trap 22 is closed, the jacks 14 are in extension and the arms 7 are directed towards a fixed knife 25 as described hereinbelow.

On the other hand, in the position illustrated in FIG. 2, in which the chopping device is neutralized, the jacks 14 are retracted, with the result that the trap 22 is open and the arms 7 are directed towards the wheel 21, which is in position for sharpening the knives 2 whilst the drum 1 is rotating and, at the same time, for grinding the contact pieces 8 for positioning of the counter-knife 25 at the distance from the geometrical axis of rotation of the drum 1 where the sharpened cutting edges of the knives are located.

Wheel 21 might extend over the whole length of the drum 1 increased by at least the total thickness of the two contact pieces 8. The wheel must be retracted before closure of the trap 22 and, in that case, this may be obtained by pivoting its support about a fixed pin or by outfolding a chassis in the form of deformable quadrilateral or any other means, these means then being controlled by a jack in time relation with the control of the jacks 14 mentioned above.

Figure 3:
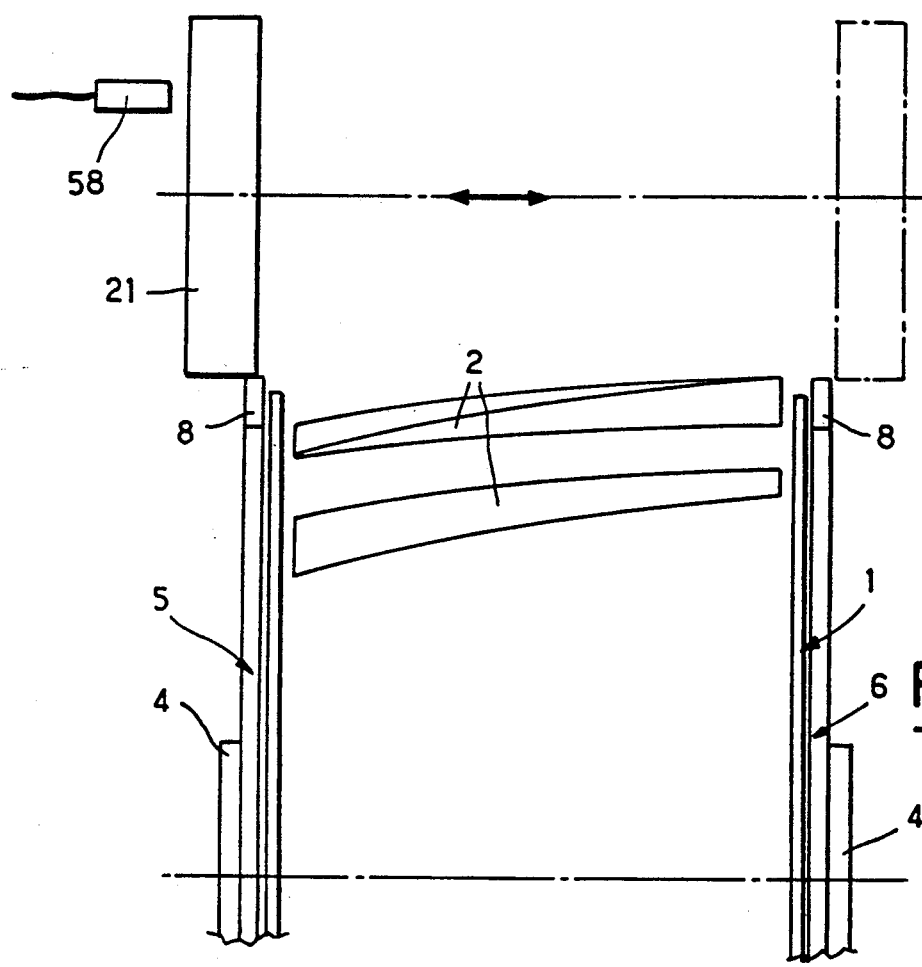
FIG. 3 is a partial diagram, on a larger scale, along line III—III of FIG. 2 and showing the intervention of the wheel to sharpen the knives and grind the contact pieces of the positioners.

In the embodiment shown more particularly in FIG. 3, the wheel 21 is relatively thin and is movable in translation parallel to the geometrical axis of the drum 1 in a stroke at least equal to the length of this drum increased by the total thickness of said wheel, and this from a retracted position illustrated in solid lines and corresponding to one of the ends-of-stroke in which the wheel is located outside the space occupied by the drum 1 and the contact pieces 8.

Assembly of the wheel 21 is illustrated in FIGS. 1 and 2. A first carriage 26 is mounted to slide along a cylindrical bar 27 and a flat ruler 28 extending parallel to each other and fixed on the frame 3. To that end, the carriage 26 may for example be provided with rollers 29 guided along the rule 28 and with a ball bearing bush guided along the bar 27. A second carriage 30 supporting the wheel 21 and the device for driving it in rotation is twinned with the first carriage 26, following the latter in translation and pivoting relatively thereto to adjust the depth of sharpening, i.e., the distance of the axes of rotation of said wheel 21 and of the chopping drum 1. To that end, carriage 30 is mounted to slide along and to pivot about the cylindrical bar 27 via for example a ball bearing bush and this carriage may be connected to carriage 26 by an adjustable coupling member 31 which, in this example, is shown schematically in the form of a screw mounted in an extension of carriage 26 and of which the free end is coupled to carriage 30.

In the position of operation of the chopping device illustrated in FIG. 1, wheel 21 is retracted, trap 20 is closed, jacks 14 are in extension and arms 7 of the rings 5 and 6 are directed towards the counter-knife 25 which is maintained applied against the previously ground contact pieces 8 of said arms.

Figure 4:
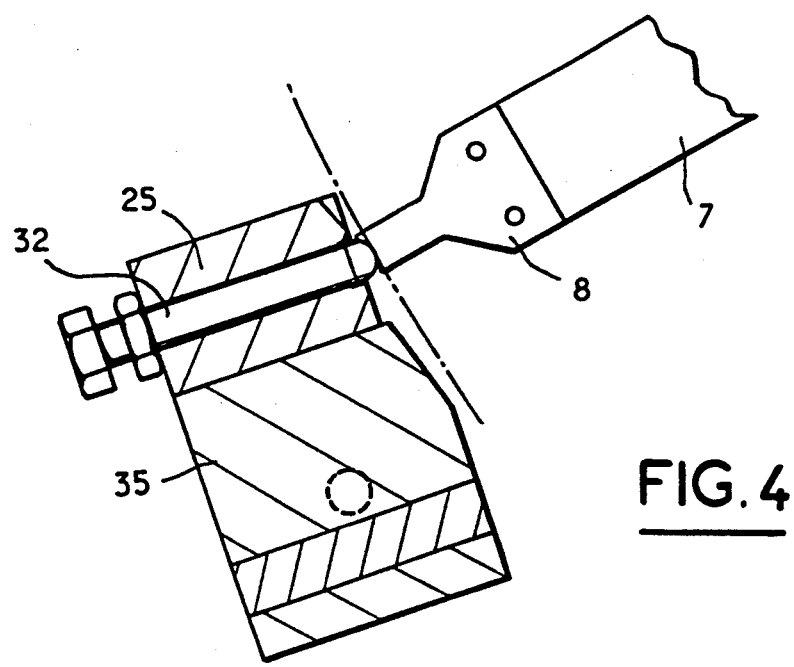
FIG. 4 is a partial diagram completing that of FIG. 3 and taken in transverse section on a larger scale along line IV—IV of FIG. 5 in order to show the subsequent positioning of the counter-knife.

Furthermore and as is apparent from FIG. 4 to 6, the contact pieces 8 are in contact with adjustable stops 32 mounted in the counter-knife 25 and constituted for example by screws (FIG. 4) cooperating with tappings in the counter-knife and with a lock nut.

To ensure adjustment of the counter-knife 25, i.e., to place its previously adjusted stops 32 in contact with the contact pieces 8 and to block it in this position, the counter-knife is fastened to a fixing device 33 and to a presser device 34.

The fixing device 33 may be of the type illustrated in FIG. 5. The counter-knife 25 in that case rests on a fixed ruler 35 mounted on the frame 3 by means of fittings 36.

Ruler 35 comprises a lower slideway 37 which, in the example shown, extends parallel to the geometrical axis of the drum 1 and in which two mobile wedges 38 and 39 are mounted to slide. These mobile wedges cooperate, by their opposite inclinations, with the conjugate inclinations of fixed wedges 40 and 41 integral with a floating ruler 42. Ruler 42 is connected to the counter-knife 25 by screws 43; the head 44 of each screw abuts, via an elastic member such as an umbrella washer 45, on said counter-knife; the shank of each screw 43 passes through cylindrical holes 48 in the latter and n the ruler 35, as well as an oblong hole 47 in the corresponding mobile wedge 38 or 38; the threaded end of each screw 43 is screwed in a tapped hole 48 in the corresponding fixed wedge.

Blocking or unblocking, respectively, of the counter-knife 25 is provoked by moving the mobile wedges 38 and 39 towards and away from each other thanks to a jack 49 of which the cooperating parts are fixed to the wedges.

The presser device 34 may be of the type illustrated in FIG. 6. It comprises two levers 50 and 51 located near the ends of the counter-knife 25. Each lever is mounted to pivot in a plane perpendicular to the geometrical axis of the drum 1. To that end, it presents a slot 52 fitted on a pivot pin 53 projecting at the end of the fixed ruler 35; at its upper end, it is articulated on a pin 54 of the counter-knife 25; at its lower end is hooked a spring 55 abutting on the fixed frame 3. In this way, the springs 55 acting on the levers 50 and 51 cause the counter-knife 25 to advance until the stops 32 are in contact with the positioning contact pieces 8.

The edges of the slot 52 of each of the levers 50 and 51 are advantageously inclined, upwardly close to the drum 1 and downwardly away from said drum, so that the elastic force of the springs 55 has for its effect not only to apply the stops 32 against positioning contact pieces 8, but also to press the counter-knife 25 on the fixed ruler 35.

Adjustment of the counter-knife 25 is automatic since it suffices to supply jacks 14 And 49 successively. Of course, the succession of the operations must be suitably ensured by an electrical, electronic or like control device.

This control device is in relation in particular with proximity detectors 56 to 59, microcontacts or the like, suitably located to attest that a function is well performed.

Detectors 56 (FIGS. 1 and 2) are located opposite the positioner arms 7 when their contact pieces 8 are in contact with the stops 32 of the counter-knife 25. They attest that trap 22 is closed.

Detectors 57 (FIGS. 1 and 2) are located opposite the positioner arms 7 when their contact pieces 8 are opposite wheel 21. They attest that trap 22 is open and that said contact pieces are in position for grinding.

A detector 58 (FIG. 3) is located near the carriages 28, 30 in longitudinal end-of-stroke position for stopping the sharpening cycle. It attests that wheel 21 is retracted.

Detectors 59 (FIG. 5) are located opposite the mobile wedges 38, 39 when they have arrived at the end of tightening stroke. They attest that the counter-knife 25 is blocked or unblocked.

What is claimed is:

1. A process for sharpening the knives of a rotating drum of a fodder-harvesting machine, and for adjusting the fixed counter-knife cooperating therewith, process comprising the steps of:

bringing at least two aligned positioners of said counter-knife opposite a knife-sharpening wheel by pivoting said positioners about the axis of rotation of the drum, said knife sharpening wheel having a fixed angular orientation in said machine, said counter-knife being provided with stops, grinding the ends of said aligned positioners with said knife sharpening wheel at the time as said knife sharpening wheel sharpens said knives of said rotating drum during rotation of said drum, thereafter returning said aligned positioners opposite said counter-knife by pivoting said positioners in the opposite direction about said axis of rotation of said drum, and adjusting said counter-knife again by applying said stops against said positioners.

2. A fodder havesting machine comprising a rotating chopping drum having a plurality of knives, a fixed counter-knife cooperable with said knives of said drum, and a retractable wheel adapted to be moved in rotation to sharpen said knives periodically, said counter-knife comprising stops, said machine further comprising at least two aligned positioners each having an end contact piece, said positioners being located near the free ends of said chopping drum mounted to pivot about the geometrical axis of said chopping drum and connected to an actuating device for bringing, by pivoting, said contact piece of each of said positioners, either opposite said retractable wheel in order to be ground to the same diameter as said knives are sharpened thereby, or opposite a corresponding stop of said counter-knife, which is fastened to a fixed support via, on the one hand, a presser device tending to apply its stops against said contact pieces of said positioners and, on the other hand, a fixing device.

3. The device of claim 2, wherein each of said positioners is an arm integral with a ring mounted to pivot about a journal of said chopping drum, said arm extending towards the periphery and comprising at its end an expendable contact piece mounted in interchangeable manner.

4. The device of claim 3, wherein said machine comprises a fixed frame and said actuation device comprises, for each of said positioners, a connecting rod of which a bent end is articulated on the ring of said positioner in question and of which the other end, suitable guided, is coupled to a jack abutting on the fixed frame of said machine.

5. The device of claim 4, wherein the end of the actuation rod coupled to said jack is articulated at the end of a lever mounted to pivot in its median part about a fixed pin, the free ends of the levers of said two positioners being articulated on a rigid longitudinal trap ensuring, on the one hand, closure of a passage made for said retractable wheel in the casing of the chopping drum and, on the other hand, coupling of the two actuation rods.

6. The device of claim 5, wherein first detection means are placed opposite said positioner arms facing said stops of said counter-knife to attest that said trap is closed and second detection means are place opposite said positioner arms facing said wheel to attest that said trap is open and that said contact pieces of said arms are in position of grinding.

7. The device of claim 2, wherein said harvesting machine comprises a frame, said device for fixing the counter-knife comprising on the one hand, a fixed ruler mounted on said frame of the harvesting machine to support the counter-knife and defining a guideway for two mobile wedges having opposite inclinations and capable of being moved towards or away from each other by a jack, on the other hand, a floating ruler integral with conjugate wedges and connected to the counter-knife resting on the fixed ruler, by screws passing therethrough.

8. The device of claim 7, wherein said screws comprise heads, said fixing device comprising elastic members interposed between said heads of said screws and said counter-knife.

9. The device of claim 7, wherein detection means are disposed opposite said mobile wedges near their tightened end-of stroke position, to attest that said counter-knife is blocked or unblocked.

10. The device of claim 2, wherein said presser device applying said stops of said counter-knife against said contact pieces of said positioners comprises at least two levers of which one end is articulated on said counter-knife, the other end being connected to an elastic member and of which the median part is mounted to pivot about a pivot pin of said fixed support.

11. The device of claim 10, wherein each lever of said presser device defines, for the passage of said pivot pin of said fixed support, a slot of which one bearing edge is inclined so that the reaction of said pin to the elastic force has for its effect not only to apply said stops of said counter-knife against the contact pieces of said positioners, but also to press said counter-knife on the said fixed support.

12. The device of claim 10, wherein said stops of said counter-knife are adjustable.

13. The device of claim 2, wherein said rotating wheel is mounted on a carriage mobile parallel to the axis of said chopping drum, said carriage being adjustable in distance relatively thereto.

14. The device of claim 13, wherein said wheel-holder carriage is, on the one hand, mounted to slide along and to pivot around a cylindrical guiding bar and, on the other hand, connected to a carriage cooperating by reaction, by an adjustable coupling member, said carriage cooperating by reaction being mounted to slide parallel to said cylindrical guiding bar.

15. The device of claim 14, wherein detection means is disposed near the longitudinal end-of-stroke of said wheel-holder carriage to attest that said wheel is retracted.

16. The device of claim 13, wherein detection means is disposed near the longitudinal end-of-stroke of said wheel-holder carriage to attest that said wheel is retracted.

* * * * *

UNITED STATES PATENT AND TRADEMARK OFFICE
CERTIFICATE OF CORRECTION

PATENT NO. : 5,209,025
DATED : May 11, 1993
INVENTOR(S): JEAN-PAUL L. M. MARTIN, et al.

It is certified that error appears in the above-identified patent and that said Letters Patent is hereby corrected as shown below:

Column 6, line 19: After "fodder" delete "havesting" and insert --harvesting--.

Column 6, line 50: Before "guided" delete "suitable" and insert --suitably.--

Column 6, line 65: After "are" delete "place" and insert --placed--.

Signed and Sealed this

Twelfth Day of April, 1994

Attest:

BRUCE LEHMAN

*Attesting Officer*

*Commissioner of Patents and Trademarks*